Dec. 13, 1960 G. ALFIERI 2,964,360
CONTROL DEVICE FOR DISTRIBUTORS HAVING A NUMBER OF SECTIONS
Filed Feb. 8, 1957 4 Sheets-Sheet 1

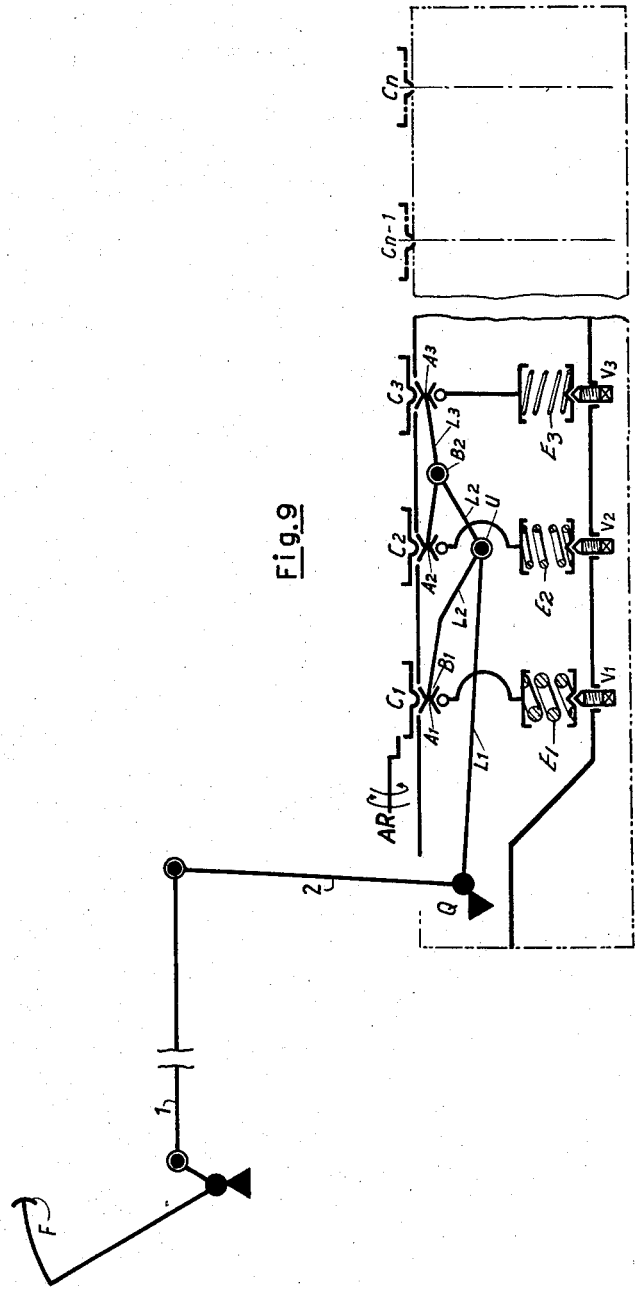

United States Patent Office 2,964,360
Patented Dec. 13, 1960

2,964,360

CONTROL DEVICE FOR DISTRIBUTORS HAVING A NUMBER OF SECTIONS

Giuseppe Alfieri, Milan, Italy, assignor to Fabrica Italiana Magneti Marelli, Milan, Italy Filed Feb. 8, 1957, Ser. No. 639,076

Claims priority, application Italy Mar. 16, 1956

11 Claims. (Cl. 303—53)

The invention relates to control devices for pneumatic distributors having a plurality of sections.

In known braking installations, a distributor may have two or three sections and may be connected on one side to a number of pressure-medium tanks and, on the other side, to a number of braking members.

There are also known installations in which two groups of braking members are fed through a distributor section, as, for example, in the combination of a truck and a trailer. In this case, the necessity has to be taken into account of initiating the braking of one vehicle, for instance of the truck, with a certain delay with respect to that of the second vehicle or trailer, or vice versa.

The means previously proposed for controlling effectively the delay of one section with respect to the other are incorporated inside the distributor when the number of sections of the latter is not high.

The present invention has the purpose of facing the problem of controlling the braking delay or advance from a more general point of view and of suggesting more rational means susceptible of being adapted to distributors with any number of sections.

The present invention is characterized in that: the distributor is provided with a control device that involves a number of sections equal to that of the distributor sections; and in that each section of the said control device is constituted by an elastic element contained in a special seat, by a member for adjusting the initial characteristics, the stroke and the compression of said element, by a member for adjusting the final stroke of the same elastic element, by a rigid connection between the elastic member of the control device and the elastic member of the corresponding distributor section, by a mobile member with or without a corresponding fixed member associated with every elastic element of the control device and by a single actuating means, mechanical or hydraulic, common to the elements of all the sections, upon which there acts, by way of appropriate connections, the brake pedal.

The invention will now be illustrated with reference to the enclosed drawings wherein:

Fig. 9 shows in diagrammatical section, a control device according to one variant.

Figure 1:
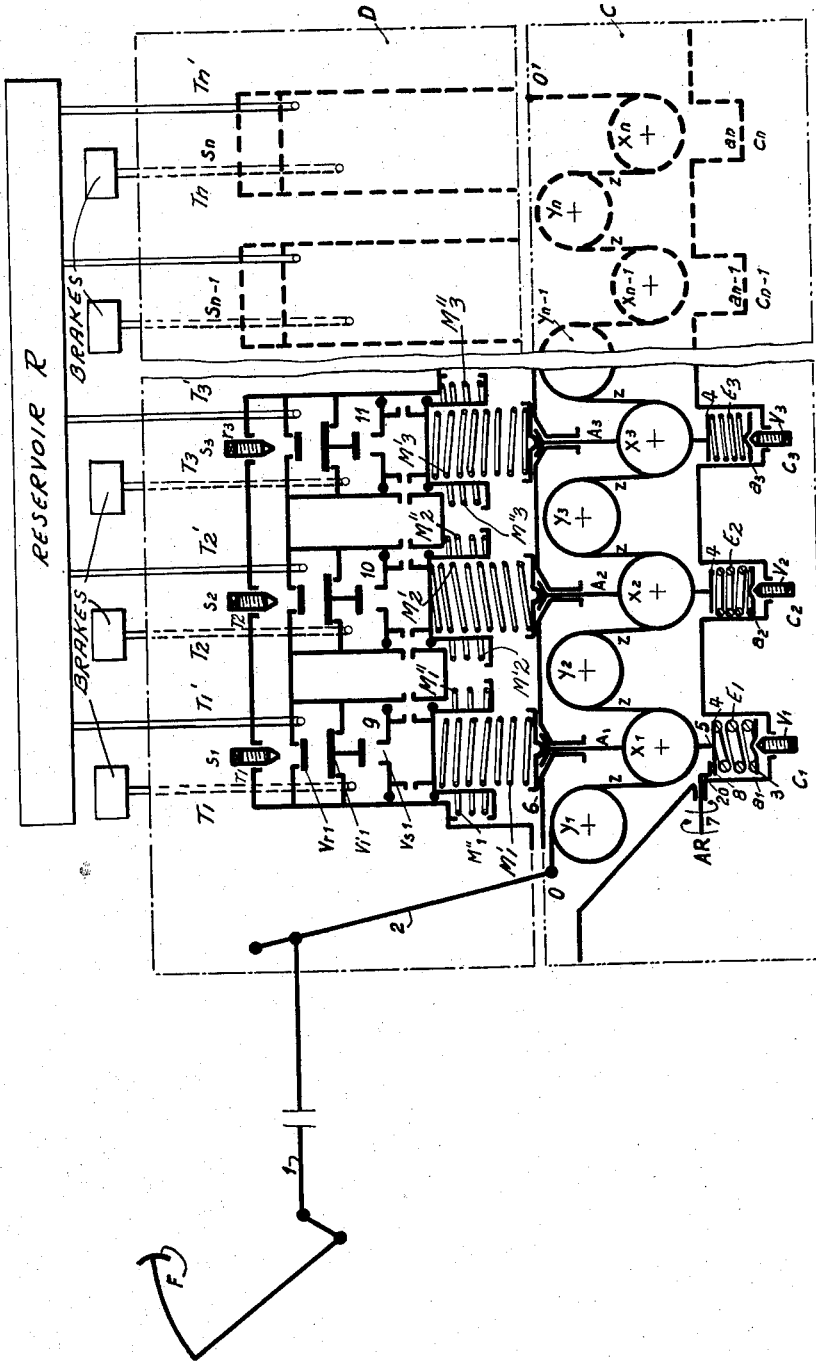
Fig. 1 is a diagrammatical and sectional illustration of a distributor having $n$ sections coupled to a mechanical device for controlling the advance.

In Fig. 1, reference D indicates a distributor with $n$ sections and reference C indicates the device for controlling the advance. Distributor D has $n$ sections S1, S2, S3, ... S$n$, coupled to a control device having a number of sections C1, C2, C3, ... C$n$, equal to the number of sections of the distributor.

Each of the sections, for example the section S1, is constituted essentially by a member $r$1, by a valve V$r$1 for retaining the compressed fluid, by a valve V$i$1 for introducing and by a valve V$s$1 for discharging the compressed fluid. Members $r$ serve to act against valves V$r$ to provide a manual control of the latter. In the lower part of each section there are two elastic elements: M'1 for adjusting the stroke and M"1 for return. Sections S are coupled by lines T to pressure fluid utilization devices such as brakes.

The conduits T' connect each section to a tank for compressed fluid.

The operation of the above distributor is known. The control device C is however, provided in accordance with the present invention.

The necessity has already been mentioned of effecting the start of action of one braking section with a certain advance with respect to the others.

The present invention provides a control device C independent of the distributor and capable of giving advances to a number of sections of the distributor, which advances can be adjusted in amplitude and duration as well as in its characteristic curve.

The device C comprises a number of sections C1, C2, C3, ... C$n$, equal to the number of sections S1, S2, S3, ... S$n$ of the distributor. Every section C acts upon the corresponding section S. In that way, the advance and the delay of one section with respect to the others can be determined with accuracy.

Fig. 1 shows a particular mechanical embodiment of the device C: every section of C comprises a fixed roll Y and a mobile roll X, a seat $a$ containing an elastic member E providing a load on which depends the advance of the section with which it is associated, a member V for adjusting said load, and a rod A connecting the mobile roll to the adjusting spring M' of the corresponding section of the distributor D.

On the fixed rolls Y and on the mobile rolls X there is arranged a traction element Z, such as a rope, chain or the like, connected at one end O to the lever 2 actuated by means of the lever 1 and thus by the pedal F of the brake. Its other end O' is fixed.

Each element E is positioned between two small plates 3 and 4. On the lower plate 3 there rests the end of member V for adjusting the load of E while on the upper plate 4 there rests a small rod 5 connected to the roll X.

The latter is provided with a rod A acting upon the plate or displaceable member 6 of the element M' for adjusting the stroke of the distributor.

The first section C1 is further provided with a member AR for adjusting the end of stroke, and constituted by a rotatable lever. Rotation of handle 7, causes knee 8 to assume different distances from the plate 4. The stop AR can thus stop the stroke of E1 in any selected position.

Operation of the apparatus is as follows: assume elastic members E1, E2, E3, ... E$n$ are absent or loaded in the same way:

In rest condition, every element M' will keep the corresponding mobile roll X and, therewith, element E, in the lowest position. In the absence of elements E or with elements E provided with equal load, a minimum stress applied by the driver's foot on the pedal F causes the levers 1 and 2 to pull the rope or chain Z at O and the point O shifts towards the left. Since O' is fixed and Z cannot elongate, the displacement of O compels the mobile rolls to rise all contemporaneously and to an equal extent upwards.

The springs M' of all the sections of the distributor are compressed and effect a stroke upwards proportional to the displacement of the point O towards the left.

This opens partially the valves V$i$ for the introduction of compressed fluid into the chambers 9, 10, 11, etc. of the sections of the distributor and the pressure of the fluid introduced into these chambers increases linearly with the stroke of M' (or, in other words, with the load exerted by A upon M').

Figure 4:
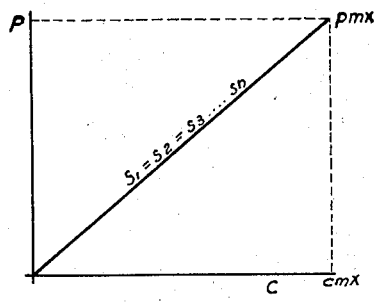
Figs. 4, 5, 6, 7 and 8 show some characteristic curves illustrating the operation of the device set forth above.

The diagram of Fig. 4 gives the curve of pressure in the sections of the distributor as a function of the stroke of the pedal F or of the point O for the case where all the elements E are equal to one another. Hence with the control device C having elements E of equal characteristics in all seats $a$, the sections of D start acting contemporaneously and pressure in said sections follows the same linear course up to the maximum pressure P$mx$ (Fig. 4).

To advance one or more sections elements E1, E2, ... E$n$ are provided with different loads which, for example, may decrease from E1 to E$n$. Assuming the maximum load of element E1, for instance, to be lower than that of M'1, common to all elements M', the rolls X will normally be in lowest position. When F is depressed, the point O will shift (abscissa of the diagrams) and the rolls will begin rising contemporaneously. To the force exerted upon the mobile rolls by element Z there will be added in every section of C the force of the previously compressed elements E. Springs E and rollers X provide cooperative additive forces. The forces of springs E are supplemental to those of rollers X. Since the elements E have different characteristics, the force exerted by them upon the corresponding roll will consequently differ. Thus in response to a minimum displacement of O there will correspond a greatest displacement of the roll X1 owing to the force exerted by E1. The roll X1, therefore, will rise more than the roll X2 which in turn will rise higher than the roll X3 and so on. However, since for the introduction of fluid into the sections S1, S2, S3, ... S$n$, the elements M' must accomplish a minimum initial stroke to move the valves V$s$ against the inlet valves V$i$, things are arranged in such a way that on applying the minimum stress upon F, the force exerted by E1 is such as to begin opening V$i$ and, therefore, to admit fluid into chamber 9. If then the stress upon F is made to increase, O will continue shifting towards the left, the rolls X will rise upwards whence the pressure in S1 will continue growing while the other sections are still closed. If the depressing of F is further continued, the shifting of X2 under the action of Z and of E2 will cause introduction of fluid into the chamber 10 and so forth.

Figure 6:
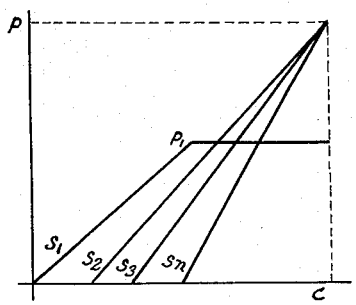

The function of the member AR is illustrated in Fig. 6. The higher position of the knee 8 corresponds to that in which E1 is completely distended and the pressure in S1 has attained maximum value. In the lowest position, as indicated in Fig. 1, 8 stops the upwards stroke of the plate 4 and, therefore, of X1, whence X1 cannot go on and, with it, M'1 and consequently, the inlet valve V$i$1 are controlled. Hence, by arranging AR as in the drawing, it is possible to stop 4, X1 and V$i$ prior to complete distending of E1 and before the pressure in 9 has attained its maximum value. The diagram of pressure in S1, therefore, appears as in the diagram of Fig. 6, from which it can be seen (curve S1) that the pressure S1 does not surpass P1, while the pressures in the other sections continue growing normally. This is very convenient in cases in which a good advanced initial braking is required in the trailer (trailing vehicle), followed by a braking of increasing strength on the axles of the truck (trailed vehicle).

Figure 7:
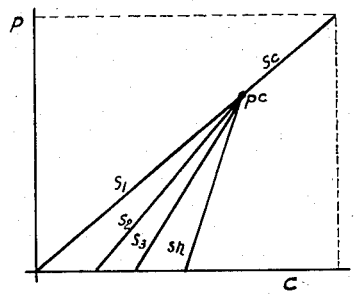
Figure 5:
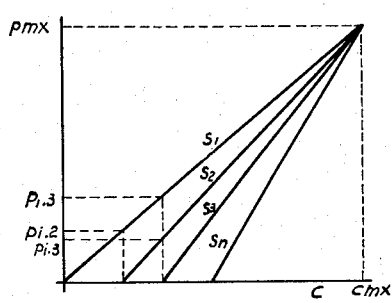

The purpose of the adjusting members V1, V2, V3, ... V$n$ is illustrated by the curves of Fig. 7. While V1, V2, ... V$n$ advance towards the interior, the initial compression of the spring will be modified as will the stroke which it carries out. In other words, by modifying the arrangement of the elements E1, ... E$n$, one also modifies the course of the characteristics of pressure and stroke of every section. With this very simple adjusting member it becomes possible to obtain braking in accordance with the diagram of Fig. 7, wherein one sees that the characteristics cross at an intermediate point to continue then up to the maximum pressure with a common outline S$c$ which may be that of one of the characteristics S1, S2, ... S$n$, or an intermediate.

Figure 8:
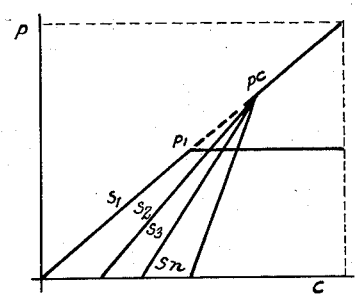

The diagram of Fig. 8 shows the more general case in which force limiting device AR is provided in the intermediate position (rotation by 90° with respect to the position indicated in Fig. 1 or an intermediate stroke) whence the pressure in S1 grows up to a value P1 different from P$mx$ while the pressures in the remaining ($n-1$) sections increase with different outlines up to the value P$i$ to continue growing up to P$mx$ with a rate equal for all the ($n-1$) sections not locked by member R. In the drawings only one stopping device AR has been indicated.

Figures 2, 3:
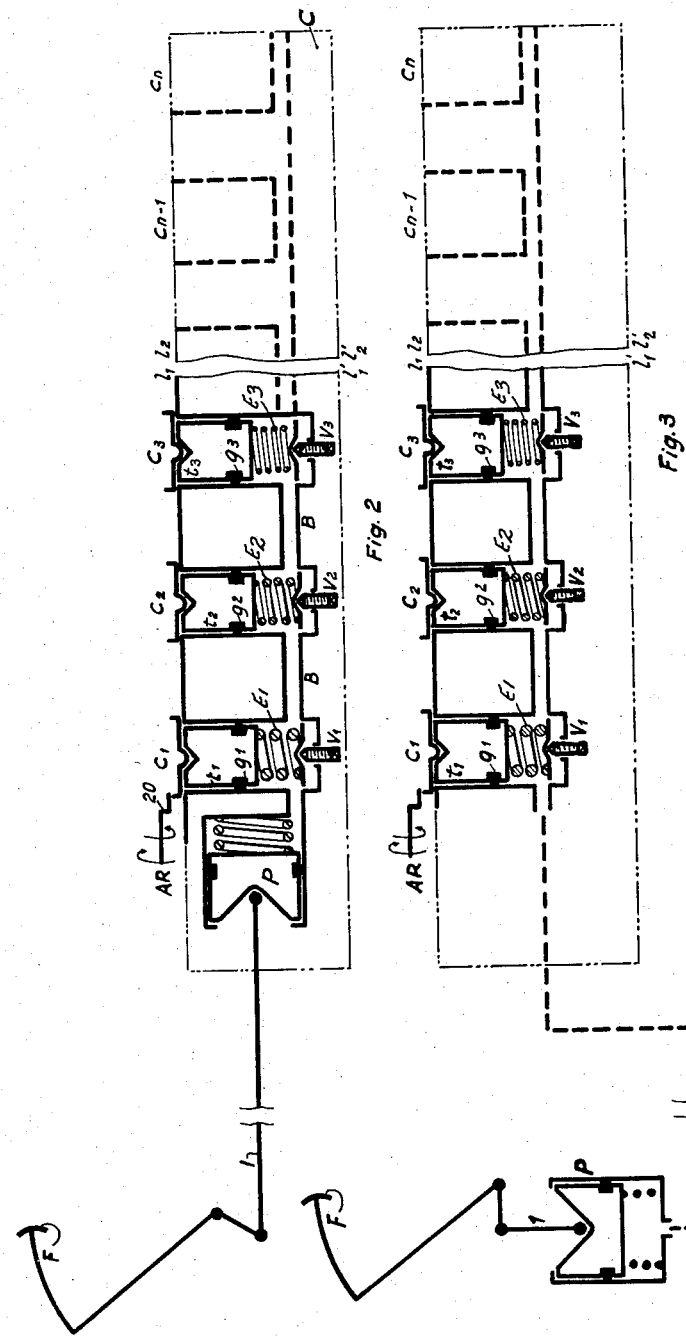
Figs. 2 and 3 show, again in section, two devices for controlling the advance, which are actuated hydraulically.

Figs. 2 and 3 represent very important variants which are actuated hydraulically.

In Fig. 2, the lever 1, associated with the brake pedal, acts upon a pump P arranged near the first section C1 of the control C. As can be seen in Figs. 2 and 3, the control device C is provided with a conduit B which passes through the device C over its whole length. Each section C1, C2, C3, ... C$n$ comprises a differential elastic element E1, E2, E3, ... E$n$ and, instead of the fixed and mobile rolls Y and X, a plunger or piston $t$1, $t$2, $t$3, ... $t$n each provided with a sealing gasket $g$1, $g$2, $g$3, ... $g$n. In the lower portion of each section C there is again present a regulator V for E.

The single conduit B replaces here the traction element Z of Fig. 1, while the mobile pistons $t$1, $t$2, $t$3, ... $t$n replace the rolls X1, X2, X3, ... X$n$.

Operation is analogous to that of the apparatus according to Fig. 1. As F is being depressed, the oil pressure in B will increase and at a certain time it will be such as to produce on the lower head of the piston, the element E of which is most loaded (e.g. E1), a lifting stress which together with the load developed by the associated element E1 will succeed in overcoming the load of M'1 of the distributor, therefore actuating the section S1 of D in advance with respect to the other sections. If the brake pedal F is further depressed, the pressure of oil will increase proportionally whence at a certain time it will attain such a value as to succeed in overcoming, in cooperation with the stress of a new element E, for instance E2, the force of corresponding element M', for instance M'2, of the distributor.

Fig. 3 shows a variant of the device of Fig. 2. The pump P is arranged immediately under the brake pedal, while the distributor with the control device according to the invention may be placed very far from the driver. Since the transmission of the forces imparted to the pedal F from the pump P to the device C takes place hydraulically, the distance between P and C may be of any magnitude whatsoever and the distributor D together with the control C may be provided in the most convenient and safe place.

The adjusting members V1, V2, V3, ... V$n$ present in the devices C, actuated hydraulically, have the same function as the corresponding members of Fig. 1. The same holds for the member AR for adjusting the end of stroke of the section having the greatest advance. As in the case of Fig. 1, more than one member AR may be employed and these should be applied to the sections having the greatest advances.

Operation of the devices according to Figs. 2 and 3 is identical to that represented by the curves of Figs. 4, 5, 6, 7 and 8.

In the variant represented in Fig. 9, the same symbols have been used so with F has been indicated again the brake pedal, with 1 and 2 the levers for transmitting the shift or stroke of the pedal F, with E1, E2, E3, ... E$n$ the elastic elements of the control sections again provided with adjusting members V1, V2, V3, ... V$n$ and with rods A1, A2, A3, ... A$n$ which will lift the corresponding bottoms of C1, C2, C3, ... C$n$ of the distributor D. The device for transmitting the control comprises essentially a lever L1 fulcrumed at Q and free to rotate at its other end U. In the case of a triplex distributor as represented in the drawings, on the free end U of the main lever L1 there is hinged the lever L2. At the end B2 of the lever L2 there is hinged a third lever L3 in such a way that the momentum transmitted by L3, whereon two loads rest, to the point U of L1 be equal to the momentum of L2 whereon only one load acts.

Operation of the device according to Fig. 9 is identical to that of the devices according to Figs. 1 through 8. On actuation of the pedal F, there results a lift on the point U. Through the lever L2 and the lever L3, the lift of the point U corresponding to a determined stroke of the pedal F will be transmitted identically and to the same extent to the rods A1, A2, A3 (in the drawing, A1, A2 and A3 are indicated only diagrammatically). However, as in the case of Figs. 1 through 8, with the incipient movement of the lever L1 and through the levers L2 and L3, on the rods A1, A2 and A3 there will develop the distending forces of the springs E1, E2, E3, whence the rod associated with the most loaded elastic element (in the specific case, A1 and E1), will undergo the greatest displacement and succeed in advancing the operation of the corresponding section C1 of the distributor with respect to the remaining sections.

The invention has been described with reference to three preferred embodiments but it is evident that the principle of the invention admits of more embodiments without departing from the scope of the invention.

What is claimed is:

1. A control for a multi-section distributor wherein each section includes a displaceable member for selectively coupling a source of pressure medium to a braking device; said control comprising a plurality of sections corresponding with the distributor sections and operatively associated therewith, first means operatively associated with the control sections for providing a force to be transmitted equally to the displaceable members, a plurality of second means respectively in said control sections, said second means respectively exerting different supplemental forces on said displaceable members, the forces of said first and second means cooperatively controlling the transmission of the pressure medium to the braking devices and a force limiting device operatively associated with one of the second means to terminate operation of the latter in the control section wherein the largest supplemental force is exerted.

2. A control as claimed in claim 1 wherein the second means in the control sections are resilient devices.

3. A control as claimed in claim 2 comprising adjustment means operatively associated with said devices for controlling the maximum forces which can be exerted thereby.

4. A control as claimed in claim 3 wherein said first means is coupled between said displaceable members and said second means.

5. A control as claimed in claim 3 wherein said second means is coupled between said displaceable members and said first means.

6. A control as claimed in claim 4 wherein said first means is mechanical.

7. A control as claimed in claim 5 wherein said first means is at least in part hydraulic.

8. A control as claimed in claim 6 wherein said first means comprises a flexible belt, series of staggered fixed and mobile rollers defining a serpentine path for the belt and engaged therewith, rigid members coupling the mobile rollers with the displaceable members and with the resilient devices, means for fixing an end of the belt and means for moving the other end of the belt whereby the mobile rollers are moved responsive to the latter said means and said resilient devices.

9. A control as claimed in claim 6 wherein said first means comprises a series of interconnected links and a lever for displacing the links to exert forces on the displaceable members.

10. A control as claimed in claim 7 wherein each control section comprises a piston and cylinder arrangement whereof the piston is coupled to a displaceable member and is operatively associated with a resilient device, said first means comprising a source of pressure medium coupled to said cylinders for exerting forces on the pistons.

11. A control as claimed in claim 10 wherein said first means comprises a lever and a piston and cylinder combination responsive to the lever for transmitting pressure medium to the piston and cylinder arrangements.

References Cited in the file of this patent

UNITED STATES PATENTS 2,680,654    Edge et al. _____ June 8, 1954